United States Patent Office 3,296,407
Patented Jan. 3, 1967

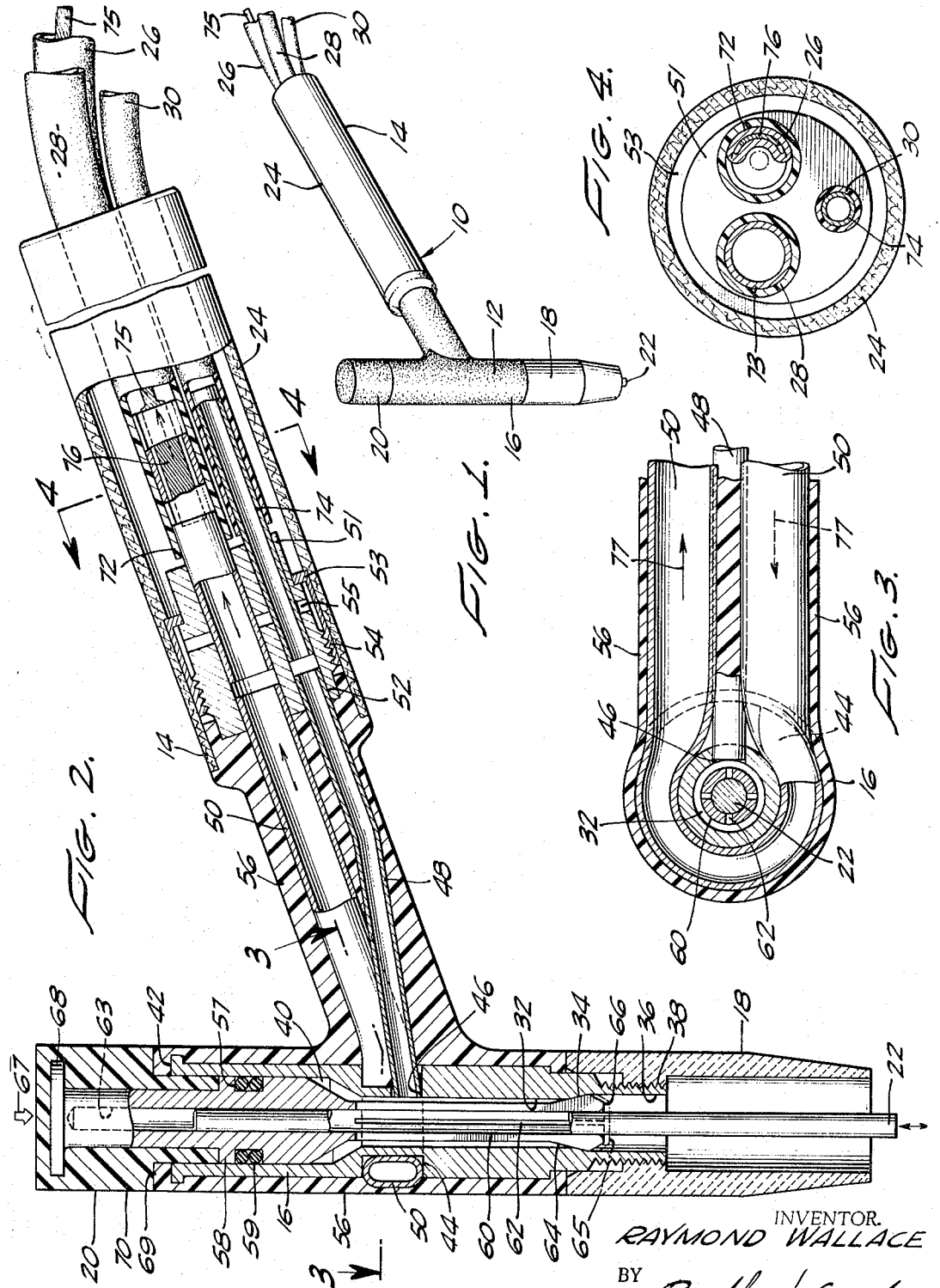

3,296,407
WELDING TORCH
Raymond Wallace, Hacienda Heights, Calif., assignor to WDL Incorporated, Los Angeles, Calif.
Continuation of abandoned application Ser. No. 465,821, June 1, 1965. This application May 2, 1966, Ser. No. 547,133
6 Claims. (Cl. 219—75)

This invention relates to welding torches and more particularly to a gas shielded arc welding torch.

This application is a continuation of Serial No. 465,821, filed June 1, 1965 and now abandoned.

The modern practice of welding such metals as aluminum, magnesium, stainless steel and other special alloys involves the shielding of the arc and the melted portion of the work with a nonoxidizing gas such as helium or argon. The arc is struck through the gas between the work and an electrode which is preferably formed of a non-consumable material such as tungsten. The prior art includes a variety of welding torches suitable for use with the gas shielding arc welding process. In U.S. Patent No. 2,606,988 issued to Dove, a typical welding torch is disclosed; another is described in U.S. Patent No. 2,922,868 issued to Hackman et al. In these as in others, the numerous parts are arranged in a complicated manner requiring hand tools to replace as well as adjust the position of an electrode. Water cooled torches are even more complicated having various chambers, passageways, and returns through which the coolant flows during the operation of the welding torch to maintain its temperature within a desired range. But such intricate passageways may be easily blocked, and in that event, the operating temperature of the welding torch may exceed the allowable limits and result in permanent damage to the torch.

These disadvantages are alleviated in the present invention by providing a compact welding torch which utilizes a minimum number of parts, a cooling system which offers minimum resistance to the flow of coolant, a quick disconnect feature allowing interchangability of the heads of the welding torch, and the important feature of permitting the operator to interchange or replace the electrode unassisted and without resort to any special type tools normally provided for that purpose.

According to the invention there is provided a welding torch comprising a cylindrical torch body, a bore extending through the torch body and forming a shoulder at one end and a taper near the other end, a groove encircling the torch body intermediate the ends and including an opening extending into the bore, an electrode holder for receiving an electrode and including an elongated stem having longitudinal crossed slots and a conical surface matching the taper near the tip of the stem to form a collet, a resilient cap of insulating material covering the exposed portion of the electrode holder and coacting with the shoulder and the collet to clamp the electrode in fixed position in the torch body, a ceramic nozzle attached to the torch body at the other end in axial alignment with the bore, first tubular means disposed in the groove and extending parallelly outwardly a predetermined distance from the torch body, second tubular means extending outwardly the same distance from the groove opening and parallelling the first tubular means, insulating means covering the torch body and the tubular means, and disconnect means disposed in a sleeve of nonconductive material and comprising an externally threaded female member adapted to receive the tubular means in spaced apart relationship, a male member adapted to receive like tubular sections coextensive with corresponding parts of the tubular means and connectable to respective sources of coolant, current and shielding gas, and a compressable seal disposed between the members, the sleeve including means for engaging the threaded female member to urge the male member in locking engagement therewith.

It is, therefore, an object of the invention to provide an improved welding torch.

It is another object of the invention to provide the gas shielded arc welding torch having an electrode holder of novel formation.

It is yet another object of the invention to provide a welding torch of the type described which utilizes a novel electrode holder that affords quick and easy replacement of the electrode carried therein.

It is still another object of the invention to provide a welding torch of the type described which does not require the use of hand or other special tools to adjust the electrode positioned in the electrode holder.

Another object of the invention is to provide a welding torch of the type described having a threaded disconnect to permit interchangability of welding torch heads of different angular configurations.

These and other objects and advantages of the invention will appear and be brought out more fully in the following specification reference being had to the accompanying drawing. In the drawing:

FIGURE 1 is a perspective view of a welding torch in accordance with the invention;

FIGURE 2 is a cross-sectional view taken in a plane passing through the axis of the head portion and handle portions of the welding torch as shown in FIGURE 1;

FIGURE 3 is a partial cross-sectional view of the invention taken along a line 3—3 as seen in FIGURE 2; and FIGURE 4 is a cross-sectional view of the handle portion of the invention taken along a line 4—4 as shown in FIGURE 2.

Referring now to FIGURE 1, shown there is a welding torch 10 constructed in accordance with the invention and comprising head portion 12 and handle portion 14. The head portion 12 includes a torch body 16, a ceramic nozzle 18 attached to the lower end of the torch body 16, and an electrode holder 20 adapted to receive and hold an electrode 22 in fixed position in the torch body 16. The handle portion 14 includes an elongated sleeve 24 of non-conductive material, into the outer end of which are passed flexible tubes 26, 28 and 30, to be described.

In FIGURE 2, the torch body 16 includes a bore 32 extending longitudinally therethrough and ending in a taper 34 which in turn ends in a slightly larger opening 36. A threaded region 38 is provided on the torch body 16 near the opening 36 to receive the ceramic nozzle 18. At the upper end of the torch body 16, the bore 32 is substantially larger in diameter to form an enlarged opening 40 which is surrounded by a shoulder 42.

A flat groove 44 encircles the torch body 16 in the region of the bore 32 below the enlarged opening 40. An opening 46 extends through the groove 44 and communicates with the bore 32. A tubular element 48, preferably of metallic material, extends from the opening 46 at a predetermined angle outwardly to the handle portion 14 and attached there in a manner to be described. A second tubular element 50 preferably somewhat larger in diameter extends around the torch body 16 and is carried in the groove 44 as shown in FIGURES 2 and 3. The tubular element 48 and 50 are connected at their outer end to a female member 52 of a threaded disconnect 54 disposed in the handle portion 14. An insulating covering or jacket 56 surrounds the torch body 16 and the tubular elements 48 and 50.

The electrode holder 20 includes a shank 58 carried in the enlarged opening 40 and an elongated stem 60 having cross slots 62 extending therealong and a conical surface 64 near the tip 66 of the stem 60. A cross slot 62 preferably extends from the tip 66 to the shank 58 of the electrode holder 20. A groove 57 is provided in the shank 58 to receive O-rings 59 to affect a seal between the shank 58 and the torch body 16. The outwardly extending portion of the electrode holder 20 includes a cap plate 68 which is embedded in an insulating material to form a resilient cap 70 having an angular surface 69 for bearing against the shoulder 42 of the torch body 16.

To install the electrode 22 in the electrode holder, a force as shown by an arrow 67 is applied causing the resilient cap 70 to give slightly and allow the tip 66 to move downwardly to the position as shown in dotted delineation by the reference numerals 65. In this position, the conical surface 64 which is in contact with the taper 34 moves slightly outwardly permitting an opening 63 which extends through the stem 60 and the shank 58 to enlargen slightly and accept the electrode 22. Upon release of the force indicated by the arrow 67, the energy stored in the resilient cap 70 causes the electrode holder 20 to move upwardly. This upward movement of the electrode holder 20 causes the collet-like tip 66 by virtue of the taper 34 and the conical surface 64 to close and exert a clamping force on the electrode 22 to hold it firmly in the torch body 16. With this arrangement, the electrode 22 may be repositioned at any time by the operator by his exerting a force indicated by the arrow 67 on the electrode holder 20 relative to the torch body 16 and while this force is maintained slide the electrode 22 to the desired position and then release the force.

It should be pointed out that the taper 34 is preferably a 10° taper which in conjunction with the resilient cap 60 provides adequate clamping pressures to hold the electrode 22 in the torch body 16. It should also be pointed out that the annular surface 69 may include a series of concentric ridges to affect a second seal backing up the O-ring seal 59 for reasons to be described.

A threaded disconnect 54 includes a male member 51, the female member 52, and a threaded insert 53 adapted to slide over the male member 51. The threaded insert 53 is forced fitted into the sleeve 24 which upon clockwise rotation relative to the female member 52 causes the male member 51 to be urged against the female member 52 in locking relationship. A gasket 55 is provided between the male member 51 and the female member 52 to provide a seal connection.

As seen in FIGURE 4, the male member 51 includes spaced apart openings having tubular extensions 72, 73 and 74. The extensions 72 and 73 are in axial alignment with the tubular elements 50; extension 74 is similarly in axial alignment with the tubular element 48. The extensions 72, 73 and 74 may extend through the male member 51 and partially into corresponding openings in the female member 52 as shown in FIGURE 2. The other ends of extensions 72, 73 and 74 receive the flexible tubes 26, 28 and 30 respectively. A current carrying conductor 75 is disposed in the flexible tube 26 and attached to the extensions 72 at a junction point 76 as shown in FIGURES 2 and 4.

The conductor 75 is coupled to a source of electrical power for providing current to the electrode 22 by way of tubular elements 48 and 50, the torch body 16, and the electrode holder 20. Coolant is supplied by way of the flexible tube 28 and flows through the tubular elements 50 in the direction of an arrow 77 as shown in FIGURE 3 to the flexible tube 26 and back to the source. Through the flexible tube 30 is supplied an inert gas such as helium or argon which flows through the tubular element 48, hence through the bore 32, along the slots 62, into the opening 36, and out of the nozzle 18 to blanket the arc which is struck between the electrode 22 and the work piece not shown. Atmospheric contamination of the shielding gas is prevented by the gasket 55 at the threaded disconnect 54 and by the O-rings 59 which together with the annular surface 69 provide an airtight seal between the electrode holder 20 and the torch body 16. The gasket 55 also prevents coolant from contaminating the shielding gas at the threaded disconnect 54. By using the threaded disconnect 54, the operator may quickly substitute the head portion 12 for one having a different angular configuration. Similarly, the operator may wish to use the different size electrode in which case he merely removes the electrode holder 20 and substitutes therefore a different electrode holder, one in which the opening 63 is of the proper size to receive the desired electrode.

Thus there has been described a novel welding torch comprising a head portion and a handle portion extending at a predetermined angle therefrom. The head portion includes a single piece torch body having tubular cooling means and gas supply means coupled thereto, an electrode holder adapted to receive an electrode and extending partially into the torch body, a resilient cap covering the outer portion of the electrode holder and coacting with the torch body to hold the electrode in fixed relation therein, and a nozzle means connected to the torch body and coaxially disposed relative to the electrode. The handle portion includes a threaded connector having male and female members with a gasket therebetween and an elongated sleeve of non-conductive material adapted to urge the members in locking engagement.

While I have herein shown and described my invention in what I have conceived to be the most practical and preferred embodiments, it is recognized that departures may be made therefrom within the scope of my invention, which is not to be limited to the details disclosed herein but is to be accorded the full scope of the claims so as to embrace any and all equivalent devices and methods.

What is claimed is:

1. A welding torch comprising a head portion and a handle portion extending therefrom, said head portion including body means having cooling means coupled thereto, electrode holder means adapted to receive an electrode and extending partially into said body means, resilient means covering the outer portion of said electrode holder means and co-acting with said body means to hold said electrode in fixed relation therewith, and nozzle means connected to said body means and coaxially disposed relative to said electrode, said handle portion including threaded connector means having male and female members, a washer disposed therebetween, and an elongated sleeve of non-conductive material adapted to urge said members in locking engagement, said female member forming the termination of a plurality of tubular elements coupled to said head portion and said male member forming a matching termination for a plurality of flexible tubes for supplying an inert gas to said nozzle means and a coolant fluid to said cooling means, one of said coolant supplying tubular means further adapted to provide a conductive path for current to flow to said electrode.

2. A welding torch comprising a cylindrical torch body; a bore extending longitudinally through said torch body and forming a shoulder at one end and a taper near the other end thereof; a radially inwardly extending groove on said torch body intermediate said ends and including an opening extending into said bore; an electrode holder for receiving an electrode and including an elongated stem having longitudinal crossed slots and a conical surface matching said taper near the tip of said stem to form a collet; a resilient cap of insulating material covering the exposed portion of said electrode holder and co-acting with said shoulder and said collet to clamp said electrode in fixed position in said torch body; a ceramic nozzle attached to said torch body at said other end in axial alignment with said bore; first tubular means disposed in said groove and extending parallelly outwardly a predetermined distance from said torch body; second tubular means extending outwardly said distance from said groove opening and parallelling said first tubular means; insulating means covering said torch body and said tubular means; and disconnect means disposed in a sleeve of non-conductive material and comprising an externally threaded female member adapted to receive said tubular means in spaced apart relationship, a male member adapted to receive like tubular sections coextensive with corresponding parts of said tubular means and connectable to respective sources of coolant, current and shielding gas, and a compressible seal disposed between said members, said sleeve including means for engaging with said threaded female member to urge said male member in locking engagement therewith.

3. In a gas shielded arc welding torch, the combination comprising a cylindrical torch body having an encircling groove and a bore extending coaxially therethrough, a slightly larger circular opening at one end of said torch body and communicating with said bore near said end to form a taper, and an enlarged opening coaxially disposed with said bore at the other end of said torch body to form a shoulder thereat; an electrode holder for receiving an electrode and having a shank guidably supported in said enlarged opening, a resilient cap extending outwardly from said shank, and an elongated stem extending from said shank inwardly through said bore and including longitudinal crossed slots and a conical surface matching said taper near the tip of said stem to form a collet, said resilient cap coacting with said shoulder and urging said conical surface into contact engagement with said taper to close said collet and secure said electrode in fixed relation in said torch body; a ceramic nozzle attached to said torch body at said one end; a first metallic tube encircling said torch body and disposed in said groove, the outer ends of said metallic tube extending outwardly in parallel arrangement from said torch body at a predetermined angle therewith; a second metallic tube extending from said groove and in communication with said bore, said second tube disposed adjacent to said metallic tube; an insulating jacket covering said torch body and said tubes; and a threaded disconnect comprising a first member having external threads and spaced apart openings for receiving separate ones of said tubes, a second member having a flange and matching tubular extensions in alignment with said openings for connecting said first metallic tube to a source of current and to a supply of coolant and said second metallic tube to a source of inert shielding gas, a washer of compressible material carried on said extensions intermediate said first and second members for providing a seal connection therebetween, and an elongated sleeve of non-conductive material forming a handle and including a metallic insert having internal threads matching said external threads and an annular surface adapted to engage said flange to urge said members into locking engagement.

4. In a gas shielded arc welding torch, the combination comprising a cylindrical torch body having an encircling groove and a bore extending coaxially therethrough, a slightly larger circular opening at one end of said torch body and communicating with said bore near said end to form a taper, and an enlarged opening coaxially disposed with said bore at the other end of said torch body to form a shoulder thereat; an electrode holder for receiving an electrode and having a shank guidably supported in said enlarged opening, a resilient cap extending outwardly from said shank and including raised concentric ridges formed on the annular end surface adjoining said shank in a plane normal thereto for providing an airtight seal between said cap and said shoulder, a flat groove recessed in said shank for receiving O-rings to provide an airtight seal between said shank and said torch body in said enlarged opening, and an elongated stem extending from said shank inwardly through said bore and including longitudinal crossed slots and a conical surface matching said taper near the tip of said stem to form a collet, said resilient cap coacting with said shoulder and urging said conical surface into contact engagement with said taper to close said collet and secure said electrode in fixed relation in said torch body; a ceramic nozzle attached to said torch body at said one end; a first metallic tube encircling said torch body and disposed in said groove, the outer ends of said metallic tube extending outwardly in parallel arrangement from said torch body at a predetermined angle therewith; a second metallic tube extending from said groove and in communication with said bore, said second tube disposed adjacent to said metallic tube; an insulating jacket covering said torch body and said tubes; and a threaded disconnect comprising a first member having external threads and spaced apart openings for receiving separate ones of said tubes, a second member having a flange and matching tubular extensions in alignment with said openings for connecting said first metallic tube to a source of current and to a supply of coolant and said second metallic tube to a source of inert shielding gas, a washer of compressible material carried on said extensions intermediate said first and second members for providing a sealed connection therebetween, and an elongated sleeve of non-conductive material forming a handle and including a metallic insert having internal threads matching said external threads and an annular surface adapted to engage said flange to urge said members into locking engagement.

5. A welding torch comprising a cylindrical torch body; a bore extending longitudinally through said torch body and forming a shoulder at one end and a taper near the other end thereof; a radially inwardly extending groove on said torch body intermediate said ends and including an opening extending into said bore; an electrode holder for receiving an electrode and including an elongated stem having longitudinal crossed slots and a conical surface matching said taper near the tip of said stem to form a collet; a resilient cap of insulating material covering the exposed portion of said electrode holder and coacting with said shoulder and said collet to clamp said electrode in fixed position in said torch body; and, a ceramic nozzle attached to said torch body at said other end in axial alignment with said bore.

6. In a gas shielded arc welding torch, the combination comprising a cylindrical torch body having an encircling groove and a bore extending coaxially therethrough, a slightly larger circular opening at one end of said torch body and communicating with said bore near said end to form a taper, and an enlarged opening coaxially disposed with said bore at the other end of said torch body to form a shoulder thereat; an electrode holder for receiving an electrode and having a shank guidably supported in said enlarged opening, a resilient cap extending outwardly from said shank, and an elongated stem extending from said shank inwardly through said bore and including longitudinal crossed slots and a conical surface matching said taper near the tip of said stem to form a collet, said resilient cap coacting with said shoulder and urging said conical surface into contact engagement with said taper to close said collet and secure said electrode in fixed relation in said torch body; and, a ceramic nozzle attached to said torch body at said one end.

References Cited by the Examiner
UNITED STATES PATENTS

| | | | |
|---|---|---|---|
| 2,468,805 | 5/1949 | Herbst | 219—75 |
| 2,659,797 | 11/1953 | Anderson et al. | 219—75 |
| 3,250,889 | 5/1966 | Himmelman | 219—75 |

RICHARD M. WOOD, *Primary Examiner.*